United States Patent
Hermann (10) Patent No.: US 6,848,006 B1
(45) Date of Patent: Jan. 25, 2005

(54) RING-MESH NETWORKS

(75) Inventor: Karen E. Hermann, Ottawa (CA)

(73) Assignee: Nortel Networks Limited (CA)

( * ) Notice: Subject to any disclaimer, the term of this patent is extended or adjusted under 35 U.S.C. 154(b) by 774 days.

(21) Appl. No.: 09/579,504

(22) Filed: May 30, 2000

(51) Int. Cl.[7] .............................................. G06F 15/173
(52) U.S. Cl. ....................... 709/239; 709/224; 709/251; 398/24; 398/48
(58) Field of Search .............................. 709/201, 204, 709/206, 207, 224, 231, 226, 225, 229, 228, 251, 239; 398/24, 48, 83, 9

(56) References Cited

U.S. PATENT DOCUMENTS

| | | | | |
|---|---|---|---|---|
| 5,920,412 A | * | 7/1999 | Chang | ........................ 398/83 |
| 6,331,906 B1 | * | 12/2001 | Sharma et al. | ................ 398/48 |
| 6,366,875 B1 | * | 4/2002 | Colizzi et al. | ................ 703/16 |
| 6,400,859 B1 | * | 6/2002 | de Boer et al. | ............... 385/24 |
| 6,487,585 B1 | * | 11/2002 | Yurkovic | .................... 709/206 |
| 6,529,298 B1 | * | 3/2003 | Phelps et al. | .................. 398/9 |
| 6,556,321 B1 | * | 4/2003 | Milton et al. | ................ 398/79 |
| 6,563,615 B2 | * | 5/2003 | Milton et al. | ................ 398/1 |

* cited by examiner

*Primary Examiner*—David Wiley
*Assistant Examiner*—Phuoc Nguyen (57) ABSTRACT

A ring-mesh network architecture is provided for increasing the working/protection bandwidth ratio (W/PBR) of transport networks. The ring-mesh network has mesh connections between some nodes, the traffic on the mesh connections being unprotected. This increases the W/PBR from the current 1:2 value to $(n-2)/(n-1)$, where n is the number of nodes, $(n-1)$ is the number of connections on each node and $(n-2)$ is the number of working connections on each node for one direction of traffic. Ring-mesh networks with add/drop multiplexers in the mesh connection are also provided.

26 Claims, 5 Drawing Sheets

RING-MESH NETWORKS

BACKGROUND OF THE INVENTION

1. Field of the Invention

The invention is directed to a network and in particular to an architecture for high-speed optical mesh networks.

2. Background Art

Network users and providers are looking for reliable networks at acceptable bandwidth (BW) cost. Reliability is the ability of the network to carry the information from source to destination with errors below a certain threshold.

Protection is a traffic preserving strategy for managing the usage of the working and the dedicated protection (redundant) bandwidth in the network. Automatic protection acts quickly enough to ensure that the client's connections remain unaffected by failures. SONET/SDH (synchronous optical network/ synchronous digital hierarchy) is provided with very effective and fast protection mechanisms, which make this technology a strong contender for the networks of the future.

SONET/SDH is a physical carrier technology for optical transmission, which can provide transport for services such as IP, ATM, Ethernet, SMDS, frame relay, DS-n, T1, E1, etc. The SONET/SDH standards define the physical interface, optical line rates known as optical carrier (OC) signals, a frame format, and an OAM&P protocol. The user signals are converted into a standard electrical format called the synchronous transport signal (STS). The optical carrier OC signals are named after the STS they carry. For example, and OC-3 carries an STS-3.

SONET/SDH protection protocols are designed for various network configurations, such as linear networks (1+1; 1:1 and 1:N protection schemes) and ring networks (unidirectional path switched rings UPSR and bidirectional line switched rings BLSR). As well known, the two digits used to define the type of protection refer to the number of "protection" (spare) fibers and the "working" fibers for a certain span. 1+1, UPSR and 1:1 schemes require 100% redundancy. 1:N, 2F (two-fiber)-BLSR and 4F-BLSR schemes require less than 100% network overbuild, as extra traffic (traffic of lower priority) may be carried between nodes on the protection bandwidth/fibers during normal operation conditions. The extra traffic is however lost when a protection switch occurs.

Typically, protection switching times are less than 50 ms for SONET. On the other hand, protection implies reserving bandwidth, and therefore transport networks are often 100% overbuilt.

SONET rings are currently the topology of choice in fiber deployment. The prime motivator for rings versus linear transport is higher survivability. A ring protects against simultaneous failure of the protection and working fibers and saves intra-ring and inter-ring pass-through traffic during node failure/isolation. In addition, while the traffic physically travels from node to node in a ring configuration, the services are practically connected in a mesh network, where each node exchanges services with any other node of the network.

The UPSRs are currently used in access networks and therefore they are not discussed herein.

The BLSR are extensively used in the backbone networks and therefore they are built for higher rates such as OC-48, OC-192, etc. Protection switching is done at the SONET line (multiplex section) sublayer. As indicated above, without extra traffic, 50% of the bandwidth available is used to protect against line or node failure conditions, i.e. 50% of the ring BW is used for the 'working traffic' and 50% for the 'protection traffic'. This means that network owners must sell the protection bandwidth at a cheaper rate than the protected or working bandwidth price. Often the protection bandwidth sits completely unused and is therefore unavailable to produce income.

WDM (wavelength division multiplexing), dense WDM (DWDM) and the technical advances in the optical switching technologies resulted in an evolution of the transport network from ring to mesh configurations. Clearly, the most economical strategy for such an evolution is to adapt the existing BLSR's to mesh architectures, for preserving the huge HW and SW investment in the existing networks. However, current protection switching protocols are specifically designed for rings and are not readily applicable to mesh transport networks.

SUMMARY OF THE INVENTION

It is an object of the present invention to provide a network architecture that will allow use of more that 50% of the network capacity to transmit working traffic.

It is another object of the invention to create a ring-mesh network on top of a BLSR by adding some switching intelligence and one or more direct paths between the nodes of the BLSR.

According to one aspect of the invention, there is provided a ring-mesh network with a bandwidth BW on all lines, for transporting a traffic signal between a source and a destination node, comprising, a bidirectional line switched ring network, having a ring working bandwidth of 50% BW and a ring protection bandwidth of 50% BW, and a mesh connection between a first and a second node of said ring network, having a mesh working bandwidth of 100% BW allocated to a mesh working traffic.

According to another aspect of the invention, there is also provided a node connected on a ring network at an end on a mesh connection of a ring-mesh network with a bandwidth BW on all lines, comprising, means for routing, in an idle mode, a ring component of a forward traffic signal received from West direction over said ring network, into said mesh connection, means for routing, in said idle mode, a mesh component of a reverse traffic signal received from a further node connected on said ring network at another end of said mesh connection, into said ring network towards the East direction, wherein said ring network has 50% of said BW allocated to a ring working traffic, 50% of said BW allocated to a ring protection traffic, and said mesh connection has 100% of said BW allocated to a mesh working traffic.

In yet another aspect of the invention, there is provided a method for creating a ring-mesh network with a bandwidth BW on all lines, comprising, connecting a plurality of traffic nodes in a bidirectional line switched ring network, allocating to said ring network 50% of the BW for a ring working bandwidth and 50% of the BW to a ring protection bandwidth, providing a mesh connection between a first and a second node of said ring network, allocating 100% of the BW to a mesh working bandwidth, and transporting a traffic signal between a source and a destination node of said ring-mesh network, on a route including said mesh connection, said traffic signal using 50% of said mesh working bandwidth, wherein working/protection BW ratio for said traffic signal is higher than 0.5.

Advantageously, the present invention builds on the existing 4F-BLSR's and 2F-BLSR's. By allowing protection of more than 50% of the working BW, a network provider would earn more revenue per unit of BW.

In addition, the solution proposed herein is simple and is inexpensive to implement.

BRIEF DESCRIPTION OF THE DRAWINGS

The foregoing and other objects, features and advantages of the invention will be apparent from the following more particular description of the preferred embodiments, as illustrated in the appended drawings, where.

DESCRIPTION OF THE PREFERRED EMBODIMENT

The term 'mesh connection' is used in this description to define a direct physical connection between two non-adjacent nodes of a ring network. The mesh connection may be a single fiber or a two-fiber line, accommodating bidirectional communication. The term 'mesh component' designates the traffic on a mesh connection. The term 'ring component' designates the traffic that travels along the original BLSR ring. For example, a hybrid component comprises a ring component, and a mesh component, indicating that the traffic signal of interest travels along both the ring and the mesh connections. The term 'line' refers to the connection between two add/drop nodes.

Figure 1A:
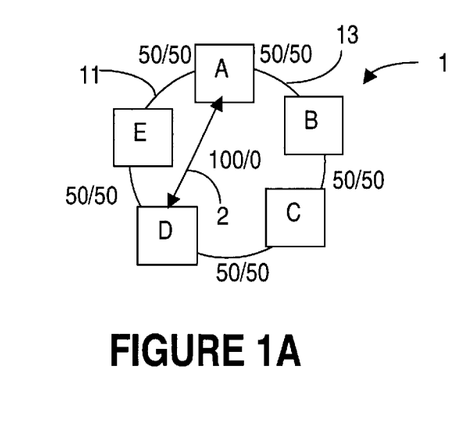
FIGS. 1A to 1C illustrate a ring-mesh network according to the invention and the principle of operation of this network.
Figure 1B:
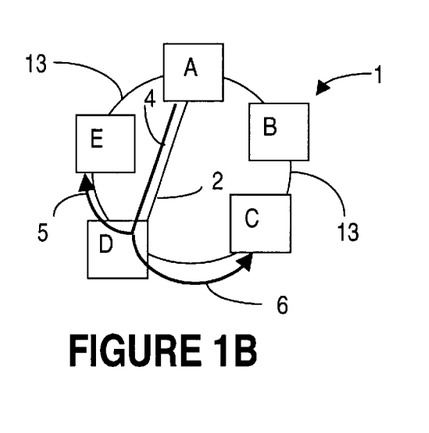
Figure 1C:
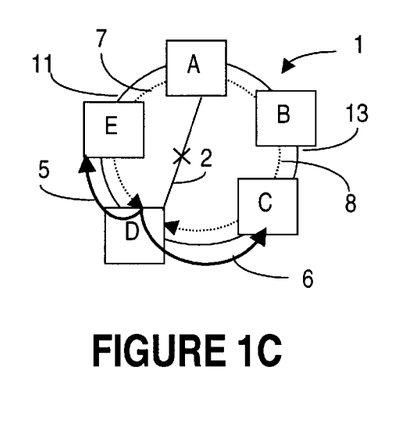

FIGS. 1A to 1C illustrate a 5-node ring-mesh network 1 according to the invention and the principle of operation of network 1. In FIG. 1A, nodes A–E are connected in a BLSR ring, where the traffic in each span A–B, B–C, C–D, D–E and E–A) travels along two fibers (2F BLSR) or four fibers (4F-BLSR). The traffic is fully protected, which means that in the case of a span or node failure, the traffic is redirected to avoid the faulted section of the ring. To this end, the bandwidth (BW) on each span of the ring is allocated equally to the working traffic and protection traffic. It is evident that the protection BW is 50% of the total BW available on the ring.

We denote herein the ring working bandwidth/component with $W_R$, and the ring protection bandwidth/ component with $P_R$. The working and protection traffic on the mesh connection are denoted herein with $W_M$ and $P_M$ respectively. We also define W/PBR as the ratio between the working and protection BW of the network. Furthermore, the working BW in the East direction with respect to a certain node (clockwise) is denoted herein with 5, the working BW in the West direction (counter-clockwise) is denoted with 6, the protection BW in the West direction with 7, and the protection BW in the East direction with 8. Similar notations are used for the respective working and protection components.

According to the invention, a mesh connection 2 is provided for example between nodes A and D. These nodes are also designated herein by terms 'first node' and 'second node'. It is to be understood that connection 2 is by way of example, and that other nodes may be equally directly connected, and also that more than one mesh connection may be provided in network 1, as it will be seen later.

As shown in FIG. 1A, the traffic on the ring is 100% protected, i.e. 50% of traffic is $W_R$ and 50% is $P_R$. If we maintain the basic functionality of the BLSR, it is possible to run 100% working traffic ($W_M$) on the mesh connection, while still having connection 2 protected by the protection BW ($P_R$) of the ring. Mesh connection A–D divides the ring into two arms. We denote the arm A–E–D shown at the left side of the ring with 11, and the arm A–B–C–D shown at the right side of the ring with 13.

FIG. 1B shows a 'hybrid traffic' from node A to nodes E and C of network 1. The mesh component A–D of the A–E and A–C traffic is denoted with 4, and is protected by the protection bandwidth of the ring 1, as discussed above. At node D, the traffic is put into the ring and directed towards node E as shown by ring component 5 and towards node C as shown by ring component 6. Ring components 5 and 6 are 50% protected, as they can use the protection BW of ring A–B–C–D–E–A. Nodes E and C are 'destination nodes', while node A is referred as the first node, and also as the 'source node' for the A–E and A–C traffic.

FIG. 1C shows a protection switching operation for the case when mesh connection 2 is lost. In this case, for the direction A–D, the traffic is split at node A and one half is routed one way around the ring on arm 11, and the other half the other way around on arm 13, as shown by the dotted lines. More specifically, 50% of the traffic will be sent on the protection BW 7 and 50% of the traffic will be sent on the protection BW 8 However, if there is less than a full pipe's worth (100%) of bandwidth to be protected, the split could be arbitrary (e.g. 50%–20% or 10%–30%).

Once the traffic gets to node D, it is put back on the working BW and continues along the originally provisioned ring components 5 and 6. In this way, the percentage of the working traffic protected by the network increases, while the network heals itself in the 50 ms time allowance to which SONET products adhere.

In case of a line failure on the ring, the ring will heal itself using the regular BLSR protection switching protocol. As well known, the working traffic on the ring is protected against single line failures for 2F-BLSR's and multiple line failures for 4F-BLSR's.

Figure 2:
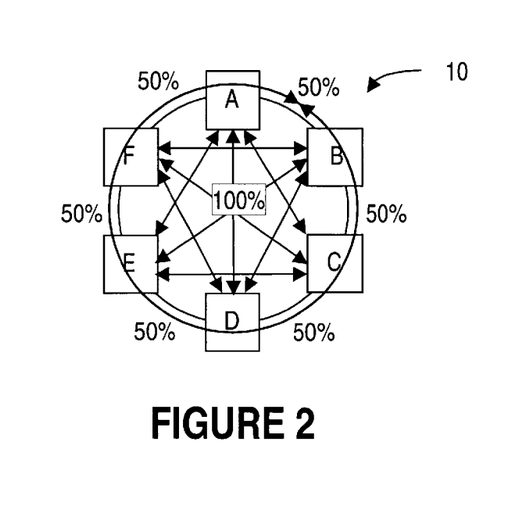
FIG. 2 shows a fully connected ring-mesh network.

FIG. 2 shows the maximum working traffic that can run on a 6-node ring-mesh network 10 (n=6). Again, all ring connections carry 50% working BW and all mesh connections carry 100% working traffic. A ring-mesh network is fully connected when each node is connected to every other node by a ring or a mesh connection. In the example of FIG. 2, each node has three mesh connections and two ring connections to the adjacent East and West nodes.

The Working/Protection Bandwidth Ratio (W/PBR) of a ring-mesh network is proportional with the number of nodes of the BLSR. Thus, in the case of a fully connected ring network, W/PBR:

$$W/PBR=(n-2)/(n-1),$$

where n is the number of nodes, (n−1) is the number of connections on each node and (n−2) is the number of working connections on each node for one direction of traffic. This gives a W/PBR of 4/5, or 80% working traffic for network 10.

In other words, this is an 1:N protection scheme. If the mesh line is four fiber, then span switches may be also performed in the mesh. When the ring is a 4F-BLSR, the ring components are protected by a 1:1 scheme, and the mesh component is protected by a 1:N protection scheme.

Figure 3A:
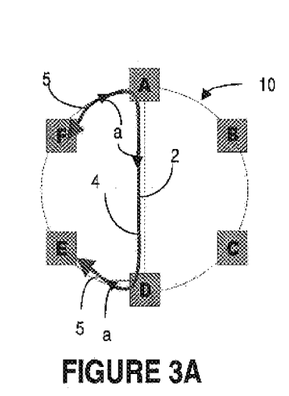
FIG. 3A illustrates an example of a hybrid connection (mesh and ring) between two nodes E and F of a 6-nodes ring-mesh network.
Figure 3B:
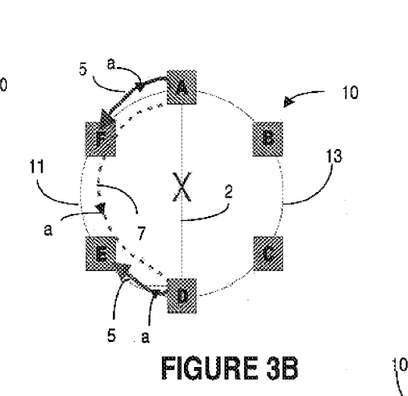
FIG. 3B shows a scenario for a line failure affecting connection E–F of ring-mesh network of FIG. 3A.

FIGS. 3A and 3B illustrate an example of a protection switch in case of a hybrid connection between nodes F and E of the 6-node ring-mesh network 10. In this example, nodes E and F are on the same side of the mesh connection 2. For the clockwise direction shown in FIG. 3A by the arrows a, node F is the source node, E is the destination node, A is the first node and B is the second node. The hybrid path comprises two ring components 5 (F–A) and 5' (D–E), and mesh component 4 (A–D). If span 2 breaks as shown in FIG. 3B for direction A–D, node A will switch the traffic from node F into the protection BW 7 of the ring. The traffic will travel along protection BW 7 to D. Node D will receive this traffic and will switch it back on the working BW 5' where it will continue on to node E. It is to be noted that the switched traffic can travel towards West on the protection BW 7 along arm 11, as shown in FIG. 3B, or toward East, along arm 13 on protection BW 8. However, the shortest path is preferred.

It is also possible to implement a head-end ring switch (HERS), whereby node E will receive the traffic from A on the protection BW 7, without it passing to node D and back.

When span 2 breaks on mesh component on the other direction of traffic (D–A), node D will perform a mesh protection switch, similar to the scenario described above for node A.

Figure 4A:
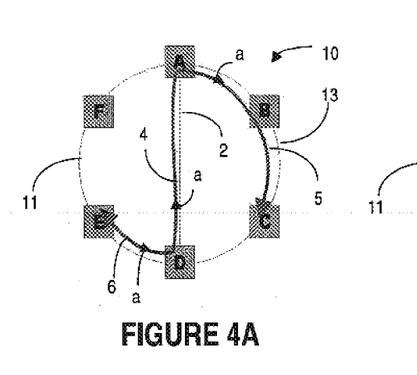
FIG. 4A shows another example of a hybrid connection between two nodes E and C.
Figure 4B:
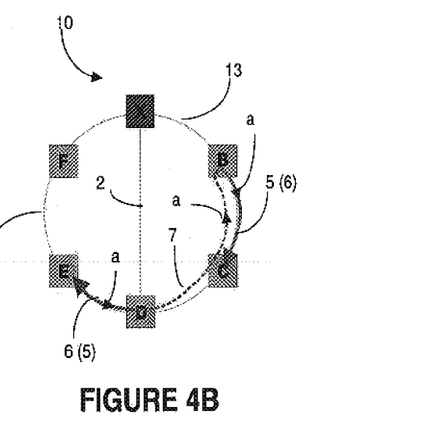
FIG. 4B illustrates a scenario for a node failure affecting connection E–B of FIG. 4A.

FIG. 4A shows an example of a hybrid connection between two nodes E and C, and FIG. 4B illustrates a scenario for a failure of node A affecting connection E–C. In this example, nodes E and C are on different side of connection 2. Node E is the source and node C is the destination. Node B is located downstream from the first node for the direction of traffic in this example. If node A fails, the failure affects both the ring components 5 and 6, and the mesh component 4. Again, the ring components will be protected using a BLSR ring switch. The mesh component 4, as well as any other mesh component (not shown) travelling to or from node A will be squelched. Nodes adjacent to the failed node will go into a ring switched mode as defined by the BLSR protection switching protocol. Any nodes sending traffic through node A via the mesh connection (node D here and node B on direction E–C), will re-route this traffic on the protection BW available on ring 10.

Namely, for direction E–C, shown by the arrows a, the working component 6 from E to D remains unaffected, traffic from D to C is sent in the protection BW 7 along arm 13 towards node B, from where it is inserted back into the working BW 5 towards node C. Node D must decide whether to re-route traffic onto protection BW 8 or protection BW 7. Since in the idle state the traffic goes through node B after it passes node A, node D must re-route traffic to node B on the protection BW 7 when it does a ring-mesh protection switch.

For direction C to E, traffic from node C to node B remains unaffected, node B inserts the traffic into the East protection BW 8 towards node D, from where it is switched back on the working BW 5 and directed to destination node E. This scenario is shown in FIG. 4B in brackets.

FIGS. 5A–5E illustrate various traffic pattern constrains for ring-mesh networks, where traffic shown uses all working bandwidth available on the lines. An important requirement for the ring mesh networks is that that all lines have the same BW (i.e. OC192, or OC48, etc.)

Figure 5A:
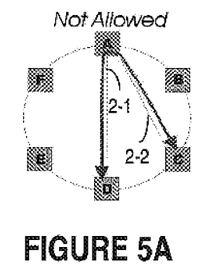
FIGS. 5A–5E illustrate various traffic pattern constrains for ring-mesh networks, where traffic shown uses all working bandwidth available on the lines.
Figure 5B:
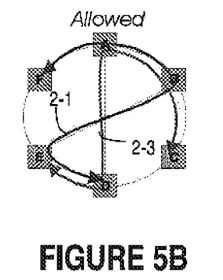

As shown in FIG. 5A, it is not possible to provision traffic to run from one mesh line 2–1 directly onto another mesh line 2—2. This is because it would be impossible to protect against losing node A if connection D–A–C uses 51%–100% of the available bandwidth. It is however possible to have hybrid connections between two nodes if they have distinct mesh connections as shown in FIG. 5B. This is possible since the hybrid connections do not share a node.

Figure 5C:
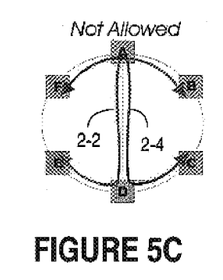

There are scenarios where connections that pass from ring to mesh from both East and West ring components through a common hub node will interfere with each-other in the case of a node failure. FIG. 5C illustrates one such scenario where connections F to C and E to B use more than 25% of the total bandwidth available on the ring. Nonetheless, node A may take traffic from East working bandwidth and switch it onto mesh connection 2–4, or it may take traffic from the West working bandwidth and switch it into a mesh connection 2—2.

Figure 5D:
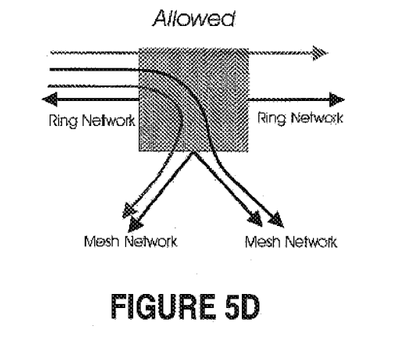
Figure 5E:
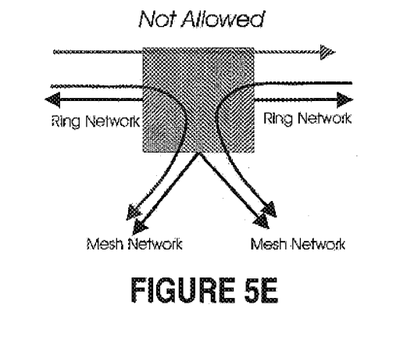

FIGS. 5D and 5E present one possible solution to this problem where traffic is limited to entering the mesh for only the East or West ring components.

Figures 6A, 6B, 6C:
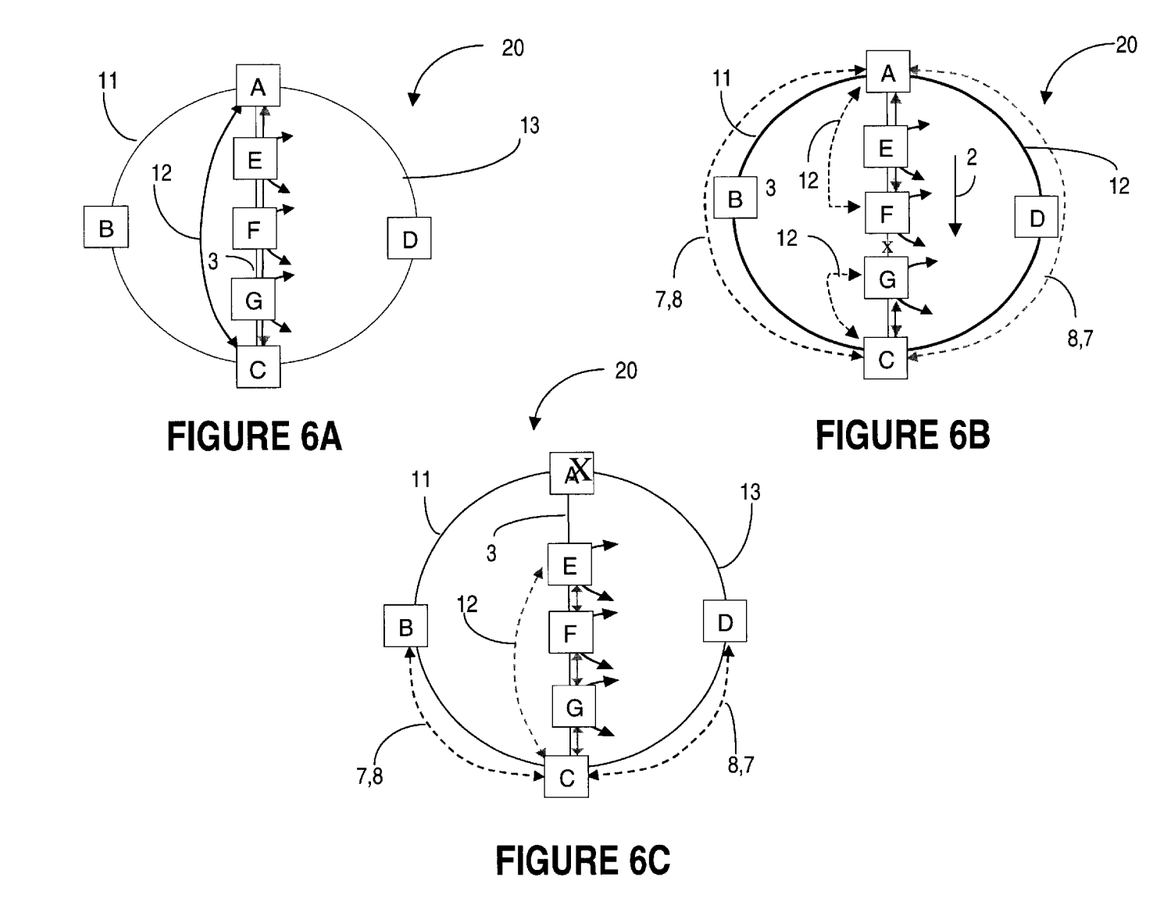
FIG. 6A illustrates a ring-mesh network with add/drop multiplexers (ADM's) in a mesh connection.
FIG. 6B shows the traffic re-distribution in case of a failure in the mesh connection for the network of FIG. 6A.
FIG. 6C shows the traffic re-distribution in case of a node failure affecting the mesh connection.

The next drawings illustrate various examples of ring-mesh networks where the mesh includes add/drop multi-plexers (ADM). FIG. 6A illustrates a ring-mesh network 20 with four ring nodes A, B, C and D, and a mesh connection 3 between nodes A and C, comprising ADM nodes E, F and G. We call the mesh connection 3 a mesh ADM connection, or an ADM arm. As indicated above, the arms of the ring connecting nodes A and C are designated by 11 and 13 respectively, and are called ring links or arms.

As in the previous examples, the BW on ring ABCD is 50% working and 50% protection, and the traffic on the mesh connection 3 is 100% working traffic. In addition, we distinguish within the working BW an ADM traffic component ($W_{adm}$), which is the working traffic between the adjacent nodes of arm 3, and an passthrough traffic component ($W_{pt}$), which is for example the working traffic travelling all the way between hub nodes A and C on arm 3.

In the case of a node or full line failure on the ADM arm 3, the passthrough traffic is completely removed from the mesh arm and sent around the ring on one of the BLSR arms. This traffic may or may not be split at hub node A, C. Any add/drop traffic passing through mesh connection 3 affected by the fault has to be turned back to the hub node (node A for A–C direction and node C for C–A direction) where it can be sent on the BLSR protection bandwidth to node C. The bandwidth that was originally being used by the passthrough traffic is available for the add/drop traffic, since the passthrough traffic on the mesh connection A–C was switched off the mesh line onto the BLSR protection BW.

The passthrough BW protects the add/drop BW and can add up to 100% of the total BW—therefore the ratio of PT/ADM traffic must be equal to one.

Thus, in the example of FIG. 6A, 50% of the BW on the mesh component 4 is pass through traffic from node A destined to node C (or from node C to node A for the opposite direction). The remaining 50% is add/drop traffic between ADM's E, F and G, meaning that each of these ADM's removes 50% of the traffic on span 3 for its own use, and inserts 50% traffic on mesh connection 3 for the remaining nodes on the mesh connection.

FIG. 6B shows re-distribution of the traffic in case of a failure in the mesh connection 3, for example between ADM's F and G. Since the passthrough traffic between nodes A and C cannot use anymore link 3, the add/drop traffic between the nodes A–E, E–F, F–G and G–C can be switched on the passthrough BW on the unaffected portions of the mesh connection 3 and routed back up to the hub node where the ring can protect it. Namely, for the direction A–C, the add/drop traffic between nodes A–E, E–F and G–C is moved on the passthrough BW 12. For the direction C–A, the traffic between node C and G is moved on the passthrough BW for that direction.

The passthrough and ADM traffic between hub nodes A and C affected by the link 3 failure is switched around the ring. Namely, node A divides the passthrough and ADM traffic for node C into two equal ring components and switches each half onto the protection BW 7 and 8 on ring ABCD, towards West and East directions, respectively. Similarly, node C divides the passthrough traffic for node A into two equal components and switches each half onto the protection BW 7, 8 on ring ABCD, towards East and West directions, respectively.

FIG. 6C shows the traffic re-distribution in case of a node failure affecting the mesh connection 3 in network 20. The scenario shown in FIG. 6C cannot be applied to a ring-mesh network where node A has multiple mesh connections to different nodes on the ring other than C, as indicated in connection with FIG. 5A. In this example, the passthrough traffic from A to C is lost, as well as the add/drop traffic from node A to node E. However, the add/drop traffic between nodes E–F, F–G and G–C is unaffected. The hybrid traffic that originally passed through node A to the nodes on the ring or the mesh, is divided by node C into a East and West component, as seen before, which are switched in the respective protection bandwidth 7 and 8. For example, a connection B–A–E–F would now travel on protection bandwidth of connection B–C–G–F. It is to be noted that component 12 is accessible for all ADM nodes in the case of failure.

Figure 7A:
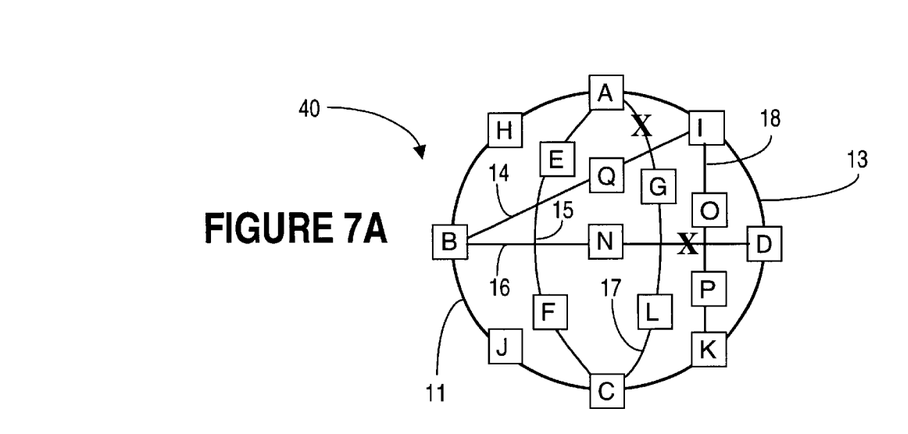
FIG. 7A illustrates a ring-mesh network with a working link failure or maintenance on two 4FR ADM arms.

FIG. 7A illustrates another architecture for a ring-mesh network, namely network 40, comprising a ring A–H–B–J–C–K–D–I and mesh arms (or mesh connections) 11,13, 15,17,14,16 and 18. Each node on the ring 40 is allowed to connect to another node on the ring using one or multiple ADM mesh connections. For example, node A connects to node C using two ADM arms 15 and 17. If a node does need to connect to multiple ring nodes, it must follow the rule described in connection with FIG. 1B. When idle, all mesh connections (ADM arms) 14,15,16,17 and 18 run 100% working traffic with 50% available for add/drop and 50% for passthrough, and the ring itself (arms 11 and 13) provides 50% working BW and 50% protection BW.

The network 40 of FIG. 7A has, lets say, a working link failure or maintenance on two ADM arms, each provided with four fibers. For example, mesh connections 17 (A–G–L–C) and 18 (B–N–D) have either suffered working line only failures, or are being maintained. One or all of their legs on these lines are in a span switch mode. Failed lines will support 50% ADM traffic. The outer ring will carry 50% working traffic, 25% A–G–L–C passthrough traffic, and 25% B–N–D passthrough traffic in the protection BW.

Note that this type of network can suffer multiple span failures on up to two separate ADM chains, if the connections are four fiber.

Figure 7B:
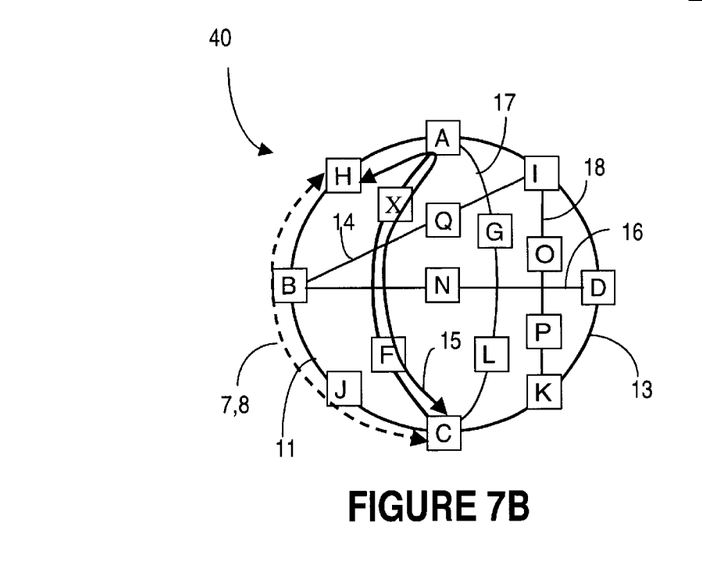
FIG. 7B illustrates the network of FIG. 7A with a single ADM node failure.

FIG. 7B illustrates the network of FIG. 7A with a single ADM node failure, e.g. node E. This failure would be resolved using the strategy demonstrated in FIG. 6C. Namely, the failed line cannot carry any passthrough traffic, but the add/drop traffic F to C. The ring 40 (A–H–J–C–K–D–I) will carry 50% working traffic, 25% passthrough traffic and 25% add/drop traffic from arm 15.

The remaining mesh connections, idle ADM lines 14,16, 17 and 18 carry as before the failure 50% passthrough traffic, and 50% add/drop traffic.

Figure 7C:
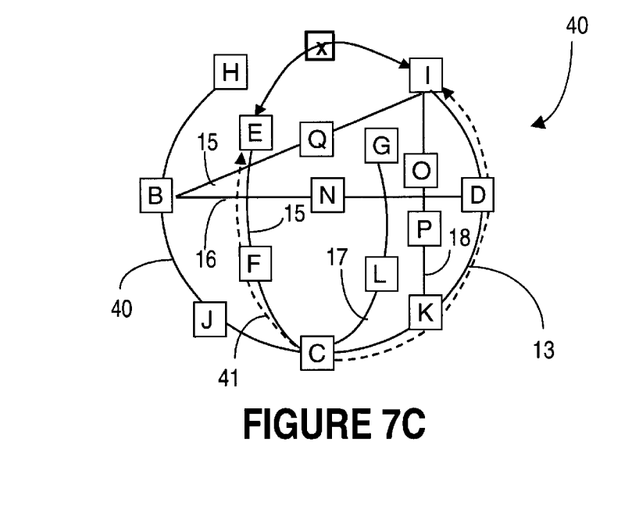
FIG. 7C illustrates the network of FIG. 7A with a hub failure.

FIG. 7C illustrates the network 40 of FIG. 7A with a hub failure, here node A. All passthrough traffic between nodes A and C is dropped in this case, since node A has failed. Any ring or mesh traffic that was trying to get to node A, travels back down the respective arm to node C and up the destination arm in the unused passthrough BW. Let's say for example that the passthrough traffic between nodes C and I used to travel before failure of node A along arm 15 (C–F–E–A–I). If hub A fails, the traffic for node C arrived at node E along arm 15, is turned back to node C as shown in the dotted line 41 on FIG. 7C, and from node C to node I on the protection BW of ring arm 13. The traffic on the unaffected mesh connections is as before, i.e. 50% passthrough traffic and 50% add/drop traffic. Similarly, the add/drop traffic between nodes E, F and C remains unaffected.

To summarize, the ring-mesh network has high working/protection bandwidth ratio, it can suffer a single node failure either hub or add/drop node, it can suffer multiple line failures on two separate arms, and can accommodate maintenance on all spans of two separate arms (this includes the ring).

The ring-mesh network has a number of constrains, as indicated above. Namely, if a node is connected to more than 1 other node through the mesh it must obey the East/West rule to ensure that the network can heal if it fails. The traffic composition must be limited to only 50% add/drop traffic.

While the invention has been described with reference to particular example embodiments, further modifications and improvements which will occur to those skilled in the art, may be made within the purview of the appended claims, without departing from the scope of the invention in its broader aspect.

I claim:

1. A ring-mesh network with a bandwidth (BW) on all lines, for transporting a traffic signal between a source and a destination node, comprising:

a bidirectional line switched ring network, having a ring working bandwidth of 50% BW and a ring protection bandwidth of 50% BW;

a mesh connection between a first and a second node of said mesh ring network, having a mesh working bandwidth of 100% BW allocated to a mesh working traffic; and wherein all lines have the same bandwidth, wherein the path of said traffic signal comprises one of a ring-only component, a hybrid component, and both a ring and a hybrid component, and wherein said hybrid component comprises a first ring component between said source node and said first node, a mesh component between said first node and said second node, and a second ring component between said second node and said destination node.

2. A ring-mesh network as claimed in claim 1, wherein said ring components are 100% protected.

3. A ring-mesh network as claimed in claim 1, wherein said mesh component is protected by said ring protection bandwidth.

4. A ring-mesh network as claimed in claim 1,
further comprising a second mesh connection between said second node and another node different from said first node, wherein said second node transfers said traffic signal from said mesh connection to said second ring connections only.

5. A method for creating a ring-mesh network with a bandwidth BW on all lines, comprising:
connecting a plurality of traffic nodes in a bidirectional line switched ring network;
allocating to said ring network 50% of the BW for a ring working bandwidth and 50% of the BW to a ring protection bandwidth;
providing a mesh connection between a first and a second node of said ring network;
allocating 100% of the BW to a mesh working bandwidth; and
transporting a traffic signal between a source and a destination node of said ring mesh network, on a route including said mesh connection, said traffic signal using 50% of said mesh working bandwidth,
wherein working/protection BW' ratio for said traffic signal is higher than 0.5.

6. A method as claimed in claim 5, wherein said traffic signal comprises one of a ring component, a hybrid component, and both a ring and a hybrid component.

7. A method as claimed in claim 6, wherein said ring component travels along said ring network between said source and destination nodes.

8. A method as claimed in claim 6, wherein said hybrid component comprises a first ring component traveling along said ring network between said source node and said first node, a mesh component traveling along said mesh connection, and a second ring component travelling along said ring network between said second node and said destination node.

9. A method as claimed in claim 8, wherein said mesh connection transports a further mesh component, within the remaining 50% of said mesh network bandwidth, for connecting said source node with a further destination node placed on said ring network on the opposite side from said destination node with respect to said second node.

10. A method as claimed in claim 7, wherein said ring component is protected by said ring protection bandwidth.

11. A method as claimed in claim 8, wherein said ring components and said mesh component are protected by said ring protection bandwidth.

12. A method as claimed in claim 5, wherein said traffic signal comprises a first hybrid component for connecting said source node with said destination node and a second hybrid component for connecting said source node with a second destination node, each said hybrid components having 50% of the BW on said mesh connection.

13. A method as claimed in claim 5, wherein said source node is said first node.

14. A method as claimed in claim 5, wherein said ring-mesh network operates in one of the following modes:
an idle mode wherein said traffic signal uses said ring and mesh working bandwidth;

a ring protection switching mode in case of a fault affecting said ring network, wherein said traffic signal is switched from said ring working bandwidth onto said ring protection bandwidth; and a ring-mesh protection switching mode in case of a fault affecting said mesh connection, wherein said traffic signal is switched from said mesh working bandwidth over said ring protection bandwidth.

15. A method as claimed in claim 14 wherein said ring-mesh protection switching mode comprises, for an interruption on said mesh connection:
informing said first and second node of said interruption;
at said first node, switching said traffic signal from said ring working bandwidth onto said ring protection bandwidth towards said second node;
at said second node, switching said traffic signal from said ring protection bandwidth onto said ring working bandwidth towards said destination node.

16. A method as claimed in claim 15, wherein said traffic signal uses said ring protection bandwidth between said first and said second nodes around either side of said ring network.

17. A method as claimed in claim 15, wherein said traffic signal uses said ring protection bandwidth between said first and said second nodes around a shortest side of said ring network.

18. A method as claimed in claim 15, wherein said destination node obtains said traffic signal directly from said ring protection bandwidth using a head end ring switch protocol.

19. A method as claimed in claim 14, wherein said ring-mesh protection switching mode comprises, for a failure of said first node:
informing said second node and a downstream node of said failure;
at said, second node, switching said traffic signal from said ring working bandwidth to said ring protection bandwidth;
at said downstream node, switching said traffic signal from said ring protection bandwidth onto said ring working bandwidth towards said destination node.

20. A method as claimed in claim 5, further comprising:
connecting a plurality of add/drop multiplexing ADM nodes into said mesh connection;
allocating 50% BW of said mesh working traffic to a mesh pass-through traffic for direct communication between said first and second node; and allocating 50% BW of said mesh working traffic to a mesh add/drop traffic for communication between said ADM nodes.

21. A method as claimed in claim 20, further comprising:
detecting an interruption in said mesh connection between a first mesh node and a second mesh node, for the direction of traffic from said first node to said second node;
at said first node, switching said pass-through traffic onto said ring protection bandwidth towards said second node;
at said first mesh node, switching said add/drop traffic onto said pass-through bandwidth towards said first node;
at said second mesh node, selecting said add/drop traffic from said pass-through bandwidth;
at said first node, directing said add/drop traffic towards said second node along said ring network.

22. A method as claimed in claim 21, further comprising at said first node, separating said pass-through traffic into a West and an East component, and switching said West and East components onto said ring protection bandwidth towards said second node.

23. A method as claimed in claim 22, wherein said West and said East components have same bandwidth.

24. A method as claimed in claim 20, further comprising:
- detecting fault at said first node affecting the direction of traffic from said first node to said second node;
- identifying said fault at said second node and at a downstream mesh node;
- dropping said pass-through traffic and said add/drop traffic between said first node and said downstream node, at said downstream mesh node, switching said add/drop traffic onto said pass-through bandwidth towards said first node;
- at said second mesh node, switching any pass-through traffic directed to a destination node on said ring nodes onto said pass-through bandwidth towards said second node;
- at said second node, switching said pass-through traffic onto said ring protection bandwidth towards said destination node.

25. A method as claimed in claim 24, further comprising at said second node separating said pass-through traffic into an East and a West component and switching said West and East components onto said ring protection bandwidth towards said destination node.

26. A method as claimed in claim 25, wherein said West and said East components have same bandwidth.

* * * * *